US009906828B2

(12) United States Patent
Kabuto et al.

(10) Patent No.: US 9,906,828 B2
(45) Date of Patent: Feb. 27, 2018

(54) VIDEO PROCESSING SYSTEM FOR DEMULTIPLEXING RECEIVED COMPRESSED AND NON-COMPRESSED VIDEO SIGNALS AND TRANSMITTING DEMULTIPLEXED SIGNALS

(71) Applicant: Hitachi Maxell, Ltd., Osaka (JP)

(72) Inventors: Nobuaki Kabuto, Kunitachi (JP); Akira Shibata, Fujisawa (JP); Yoshiaki Mizuhashi, Yokohama (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 15/179,154

(22) Filed: Jun. 10, 2016

(65) Prior Publication Data

US 2016/0286161 A1    Sep. 29, 2016

Related U.S. Application Data

(60) Continuation of application No. 14/248,691, filed on Apr. 9, 2014, now Pat. No. 9,392,321, which is a
(Continued)

(30) Foreign Application Priority Data

Jun. 27, 2005  (JP) .................................. 2005-185925

(51) Int. Cl.
*H04N 5/76* (2006.01)
*H04N 21/426* (2011.01)
(Continued)

(52) U.S. Cl.
CPC ....... *H04N 21/42615* (2013.01); *H04N 7/088* (2013.01); *H04N 21/4104* (2013.01);
(Continued)

(58) Field of Classification Search
CPC ................................................. H04N 21/42615
(Continued)

(56) References Cited

U.S. PATENT DOCUMENTS 4,789,860 A    12/1988   Brennand et al.
5,436,675 A    7/1995    Hayashi et al.
(Continued)

FOREIGN PATENT DOCUMENTS

CN    1254999    5/2000
CN    1547852    11/2004
(Continued)

OTHER PUBLICATIONS

Chinese Office Action received in corresponding Chinese Application No. 200910119024.8 dated Jun. 12, 2014.
(Continued)

*Primary Examiner* — Richard Torrente
(74) *Attorney, Agent, or Firm* — Mattingly & Malur, PC (57) ABSTRACT

The present invention is intended to permit both real-time display of a picture represented by a non-compressed video signal on a television and display of a picture represented by a compressed video signal at any desired time by simultaneously transmitting the compressed video signal and non-compressed video signal via one interface. An STB packetizes a compressed video signal, and multiplexes the compressed video signal and a blanking signal combined with a non-compressed video signal. Thus, both the video signals are transmitted simultaneously. A picture represented by the non-compressed video signal is displayed on a television in real time. The compressed video signal is stored in a storage medium incorporated in the television, read at any user's desired time, and decoded so that a picture represented by the compressed video signal can be viewed at the user's desired time.

2 Claims, 10 Drawing Sheets

Related U.S. Application Data division of application No. 13/400,746, filed on Feb. 21, 2012, now abandoned, which is a continuation of application No. 11/475,137, filed on Jun. 27, 2006, now Pat. No. 8,130,794.

(51) Int. Cl.

| | | |
|---|---|---|
| *H04N 7/088* | (2006.01) | |
| *H04N 21/432* | (2011.01) | |
| *H04N 21/433* | (2011.01) | |
| *H04N 21/434* | (2011.01) | |
| *H04N 21/41* | (2011.01) | |
| *H04N 21/4147* | (2011.01) | |
| *H04N 21/437* | (2011.01) | |
| *H04N 21/4385* | (2011.01) | |
| *H04N 21/43* | (2011.01) | |
| *H04N 21/436* | (2011.01) | |

(52) U.S. Cl.
CPC ..... *H04N 21/4122* (2013.01); *H04N 21/4147* (2013.01); *H04N 21/4263* (2013.01); *H04N 21/437* (2013.01); *H04N 21/4307* (2013.01); *H04N 21/4325* (2013.01); *H04N 21/4332* (2013.01); *H04N 21/4334* (2013.01); *H04N 21/4344* (2013.01); *H04N 21/4347* (2013.01); *H04N 21/4348* (2013.01); *H04N 21/4385* (2013.01); *H04N 21/43615* (2013.01)

(58) Field of Classification Search
USPC ........................................................ 386/236
See application file for complete search history.

(56) References Cited

U.S. PATENT DOCUMENTS

| | | | |
|---|---|---|---|
| 5,652,767 A | 7/1997 | Kiyonaga et al. | |
| 5,838,383 A | 11/1998 | Chimoto et al. | |
| 5,850,527 A | 12/1998 | Suzuki | |
| 5,864,681 A | 1/1999 | Proctor et al. | |
| 6,266,383 B1 | 7/2001 | Kikuchi | |
| 6,532,042 B1 | 3/2003 | Kim | |
| 6,735,658 B1* | 5/2004 | Thornton | G06F 13/409 710/2 |
| 6,741,795 B1 | 5/2004 | Takehiko et al. | |
| 6,754,347 B1 | 6/2004 | Hamada | |
| 6,985,530 B1 | 1/2006 | Zerbe | |
| 7,012,932 B1 | 3/2006 | Mizobata | |
| 7,016,595 B1 | 3/2006 | Ishino et al. | |
| 7,295,578 B1 | 11/2007 | Lyle et al. | |
| 2002/0114462 A1 | 8/2002 | Kudo et al. | |
| 2003/0011680 A1 | 1/2003 | Tanaka et al. | |
| 2003/0011681 A1 | 1/2003 | Ohmura | |
| 2003/0011702 A1 | 1/2003 | Ohmura et al. | |
| 2003/0011703 A1 | 1/2003 | Tanaka et al. | |
| 2003/0025797 A1 | 2/2003 | Ohmura et al. | |
| 2003/0025806 A1 | 2/2003 | Ohmura et al. | |
| 2003/0025809 A1 | 2/2003 | Ohmura et al. | |
| 2003/0035054 A1 | 2/2003 | Ohmura | |
| 2003/0048364 A1 | 3/2003 | Ohmura | |
| 2003/0122954 A1 | 7/2003 | Kassatly | |
| 2003/0170003 A1 | 9/2003 | Levesque et al. | |
| 2004/0075773 A1 | 4/2004 | Kimura | |
| 2004/0146285 A1 | 7/2004 | Matsui et al. | |
| 2004/0235413 A1* | 11/2004 | Min | H04N 1/0032 455/1 |
| 2005/0057658 A1 | 3/2005 | Ohmura et al. | |
| 2005/0069130 A1 | 3/2005 | Kobayashi | |
| 2005/0174431 A1 | 8/2005 | Ohmura et al. | |
| 2006/0098743 A1 | 5/2006 | Nakajima et al. | |
| 2006/0114339 A1 | 6/2006 | Ohmura et al. | |
| 2006/0133773 A1 | 6/2006 | Ohmura et al. | |
| 2008/0122935 A1 | 5/2008 | Ohmura et al. | |
| 2008/0136938 A1 | 6/2008 | Ohmura et al. | |
| 2008/0151074 A1 | 6/2008 | Ohmura et al. | |
| 2008/0158367 A1 | 7/2008 | Ohmura et al. | |
| 2008/0158368 A1 | 7/2008 | Ohmura et al. | |
| 2008/0180552 A1 | 7/2008 | Ohmura et al. | |
| 2009/0009608 A1 | 1/2009 | Ohmura et al. | |
| 2009/0009625 A1 | 1/2009 | Ohmura et al. | |

FOREIGN PATENT DOCUMENTS

| | | |
|---|---|---|
| CN | 1607793 A | 4/2005 |
| GB | 2 335 806 A | 9/1999 |
| JP | 61-256880 A | 11/1986 |
| JP | 6-319110 A | 11/1994 |
| JP | 6-350587 A | 12/1994 |
| JP | 7-264092 A | 10/1995 |
| JP | 8-79641 A | 3/1996 |
| JP | 08-307455 | 11/1996 |
| JP | 10-320916 A | 12/1998 |
| JP | 10-327202 A | 12/1998 |
| JP | 10-334615 A | 12/1998 |
| JP | 11-98130 A | 4/1999 |
| JP | 11-177957 A | 7/1999 |
| JP | 11-266397 A | 9/1999 |
| JP | 2000-134572 A | 5/2000 |
| JP | 2000-354218 A | 12/2000 |
| JP | 2001-78115 A | 3/2001 |
| JP | 2001-257952 A | 9/2001 |
| JP | 2001-257956 A | 9/2001 |
| JP | 2002-014664 A | 1/2002 |
| JP | 2002-245718 A | 8/2002 |
| JP | 2002-300578 | 10/2002 |
| JP | 2002-314969 | 10/2002 |
| JP | 2003-018495 A | 1/2003 |
| JP | 2003-163889 A | 6/2003 |
| JP | 2003-318874 | 11/2003 |
| JP | 2004-120364 A | 4/2004 |
| JP | 2004-138933 | 5/2004 |
| JP | 2004-147236 A | 5/2004 |
| JP | 2004-207890 A | 7/2004 |
| JP | 2004-260849 A | 9/2004 |
| JP | 2004-260850 A | 9/2004 |
| JP | 2004-266855 A | 9/2004 |
| JP | 2004-266856 A | 9/2004 |
| JP | 2004-274786 A | 9/2004 |
| JP | 2004-304817 A | 10/2004 |
| JP | 2006-135571 A | 5/2006 |
| JP | 2008-123661 A | 5/2008 |
| JP | 2008-165975 A | 7/2008 |
| JP | 2008-171548 A | 7/2008 |
| JP | 2008-251155 A | 10/2008 |
| JP | 2010-73305 A | 4/2010 |
| WO | 2004/055757 | 7/2004 |

OTHER PUBLICATIONS

Japanese Office Action received in corresponding Japanese Application No. 2015-007736 dated Dec. 1, 2015.
CEA Standard, CEA-861-B, A DTV Profile for Uncompressed High Speed Digital Interfaces, U.S. CEA, 2002.
CEA Standard, CEA-775-B, DTV 1394 Interface Specification, U.S. CEA, 2004.
Chinese Office Action dated Jan. 4, 2012 in Application No. 200910119023.3.
Chinese Office Action dated Oct. 16, 2012 in Application No. 2011-011513.
Japanese Office Action dated Mar. 26, 2013 in Application No. 2001-011513.

* cited by examiner

VIDEO PROCESSING SYSTEM FOR DEMULTIPLEXING RECEIVED COMPRESSED AND NON-COMPRESSED VIDEO SIGNALS AND TRANSMITTING DEMULTIPLEXED SIGNALS

CROSS REFERENCE TO RELATED APPLICATION

This application is a continuation application of Ser. No. 14/248,691, filed Apr. 9, 2014, which is a divisional application of Ser. No. 13/400,746, filed Feb. 21, 2012, now abandoned, which is a continuation application of application Ser. No. 11/475,137, filed Jun. 27, 2006, now U.S. Pat. No. 8,130,794, issued Mar. 6, 2012, the disclosure of which is hereby incorporated by reference.

BACKGROUND OF THE INVENTION

1. Field of the Invention

The present invention relates to a transmission method for a digital video signal, and a video processing system, for example, a set-top box (STB) that receives a digital television signal or a television display device.

2. Description of the Related Art

Along with both the prevalence of high-definition (HD) televisions (TV) reaping the benefit of digital terrestrial broadcasting and the sale of Blu-ray recorders capable of recording high-definition TV programs, the need for digital video interfaces via which a high-quality high-definition video signal is transmitted to televisions without deterioration of picture quality has been increased these days. The standards for interfaces supporting transmission of a non-compressed video signal include the digital visual interface (DVI) standards which are formulated by the Digital Display Working Group (DDWG), and the high-definition multimedia interface (HDMI) standards to be licensed by a limited liability company (LLC). Moreover, the standards for interfaces supporting transmission of a video signal compressed based on the MPEG standards or the like include the IEEE 1394 standard and the standards for local-area networks (LANs). A related art in which the interface supporting transmission of a non-compressed video signal is adapted to a television is described in, for example, Non-patent Document 1. This literature discloses a technology for multiplexing a non-compressed video signal that is not transformed into packets (that is, not packetized), and information on the format for the video signal which is packetized. Moreover, the HDMI standards stipulate that audio data is also packetized and transmitted. A related art for adapting the interface, which supports transmission of a compressed video signal, to a television is described, for example, in Non-patent Document 2. Moreover, copyright protection technologies devised based on the above standards include, for example, the high-bandwidth digital content protection (HDCP) system that treats the non-compressed video signal and the digital transmission content protection (DTCP) system that treats the compressed video signal.

Moreover, the serial digital data interface (SDDI) system for packetizing both a non-compressed video signal and a compressed video signal and transmitting them in sequence over a single line is described, for example, in Patent Document 1.

Patent Document 1: Japanese Unexamined Patent Publication No. 8-307455

Non-patent Document 1: Written Standards CEA-861-B, U.S. CEA, 2002

Non-patent Document 2: Written Standards CEA-775-B, U.S. CEA, 2004

SUMMARY OF THE INVENTION

The number of types of signal sources will presumably increase, and televisions will be requested to include input interfaces via which a non-compressed video signal and a compressed video signal respectively are received. However, two types of interfaces that require different connectors are included in a television (a television receiver or the like), a connector space must be preserved and two types of cables must be prepared. Patent Document 1 discloses the system for transmitting the non-compressed video signal and compressed video signal simultaneously. The transmission system is suitable for broadcasting stations. In other words, it is hard to implement the transmission system described in Patent Document 1 in a television for general home use because the non-compressed video signal is packetized.

Moreover, the number of copyright protection technologies to be employed increases along with an increase in the number of types of interfaces to be handled. Nevertheless, the increasing number of copyright protection technologies should be properly implemented.

The present invention addresses the foregoing problems. An object of the present invention is to provide a technology relevant to an interface via which both a non-compressed video signal and a compressed video signal can be transmitted. Another object of the present invention is to provide a technology capable of appropriately protecting a copyright.

In order to accomplish the above objects, the present invention is characterized in that a received compressed video signal is decoded in order to produce a non-compressed video signal, that the compressed video signal is combined with a blanking signal contained in the non-compressed video signal, and that the resultant video signal is transmitted. Moreover, the present invention is characterized in that a compressed video signal that is packetized is combined with a non-compressed video signal that includes synchronizing (hereinafter sync) signals and is not packetized, and that the resultant video signal is transmitted. Owing to the constituent features, both the non-compressed video signal whose transmission method is determined based on, for example, the DVI or HDMI standards, and the compressed video signal whose transmission method is determined based on, for example, the IEEE 1394 standard or the like can be transmitted via one type of interface. This obviates the necessities of preserving the space for two connectors and preparing two types of cables, and leads to a decrease in a cost.

Moreover, the second constituent feature of the present invention is to perform a plurality of pieces of encipherment on video signals to be transmitted or received via one interface, and to select one of the plurality of pieces of encipherment. The selection may be achieved in response to an enciphered change instruction issued from a user.

According to the present invention, an interface to be used in common between the non-compressed video signal and compressed video signal can be provided. Moreover, a copyright can be preferably protected.

BRIEF DESCRIPTION OF THE DRAWINGS

These and other features, objects, and advantages of the present invention will become more apparent from the following description when taken in conjunction with the accompanying drawings wherein.

DETAILED DESCRIPTION OF PREFERRED EMBODIMENTS

Referring to the drawings, the preferred embodiments of the present invention will be described below. The present invention simultaneously transmits both a non-compressed video signal and a compressed video signal via a common (the same) interface. The transmission is achieved while the connectivity via a non-compressed digital interface such as a DVI interface or an HDMI interface that is prevailing is held intact. In the embodiments to be described below, a video processing system includes a set-top box (STB) with, for example, a built-in digital tuner and a television display device (hereinafter a television). Needless to say, the embodiments can be adapted to the other video processing systems.

First Embodiment

Figure 1:
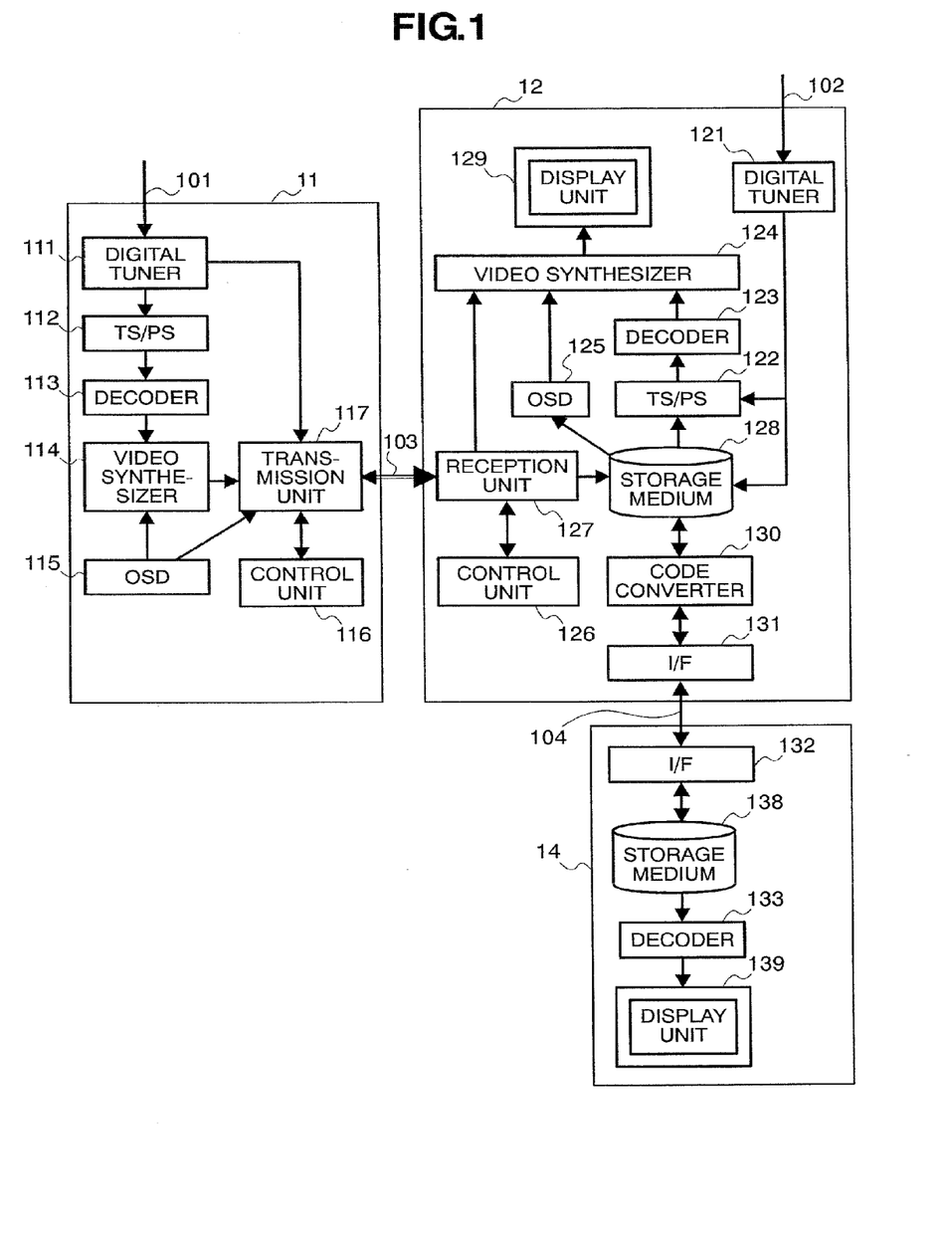
FIG. 1 is a block diagram showing a first embodiment of a video processing system in accordance with the present invention.

FIG. 1 is a block diagram showing the first embodiment of the present invention. The first embodiment includes a set-top box (STB) 11 that is an example of a video processing system, a television 12 that is another example of the video processing system, and a mobile viewer 13 making it possible to view a picture in any place other than a home. Examples of actions to be performed by these pieces of equipment will be described below.

The STB 11 receives a radiofrequency signal 101 sent through digital broadcasting or over a cable. A digital tuner 111 demodulates a transport stream (hereinafter a TS) carried by a compressed video signal. A TS/PS converter 112 samples a program stream (hereinafter a PS) from the demodulated TS. A decoder 113 produces a non-compressed video signal. A video synthesizer 114 synthesizes the non-compressed video signal with an on-screen-display (OSD) screen picture produced by an OSD unit 115. The non-compressed video signal is not transformed into packets (that is, not packetized) but is transmitted from a transmission unit 117 to a reception unit 127 included in the television 11 via a video signal interface 103. The non-compressed video signal received by the reception unit 127 is transferred to a display unit 129 via a video synthesizer 124. The display unit 129 displays a real-time screen picture according to the non-compressed video signal, and thus presents the picture to a user. Control units 116 and 126 control multiplexing to be performed by the transmission unit 117 and reception unit 127 and also control communicating circumstances. Moreover, the control unit 126 informs the STB 11 of the displaying ability of the television 12, and the control unit 116 matches the format for a video signal to be transmitted from the STB 11 with the display-related characteristics of the television 12. Furthermore, the control units 116 and 126 transfer remote-control control codes so as to control bidirectional communication so that the STB 11 and television 12 can be interlocked with each other.

On the other hand, a TS output of the digital tuner 111 and an OSD output of the OSD unit 115 are transferred to the transmission unit 117. The transmission unit 117 combines the TS and OSD packets with a non-compressed video signal so as to produce a multiplex video signal, and transmits the multiplex video signal to the reception unit 127 via the interface 103. The reception unit 127 separates the multiplex video signal into the non-compressed video signal and the TS and OSD packets. The TS and OSD packets separated or sampled by the reception unit 127 are stored in a storage medium 128. The storage medium 128 is realized with, for example, a hard disk.

Alternatively, a semiconductor memory such as a flash memory will do. Thus, a picture is recorded based on the TS. The stored TS is read from the storage medium 128 in response to a user's instruction. A TS/PS converter 122 samples a PS, and a decoder 123 produces a non-compressed video signal. At the same time, OSD data is read from the storage medium 128, if necessary. An OSD unit 125 uses the OSD data to produce a non-compressed OSD video signal. A video synthesizer 124 synthesizes the OSD video signal with the non-compressed video signal sent from the decoder 123. A picture represented by the non-compressed video signal produced by synthesizing the stored video signal with the OSD data is displayed on the display unit 129. A user can view the motion picture at any desired time.

As long as the television 12 includes the digital tuner 121, the television 12 can receive a digital television signal in the same manner as the STB 11 can. The TS carried by the television signal is stored in the storage medium 128, and the picture represented by the TS can be viewed at any desired time. Furthermore, the video synthesizer 124 may synthesize a non-compressed video signal received through the TS/PS converter 122 and decoder 123 with a non-compressed video signal sent from the STB 11 so that two screen pictures can be simultaneously displayed on the display unit 129. Alternatively, the digital tuners 111 and 121 may receive signals that fall within different channels, and the signals may be synthesized in order to display two screen pictures. Otherwise, a video signal falling within one channel supported by a terrestrial digital tuner and a video signal falling within another channel supported by a cable TV tuner may be synthesized in order to display two screen pictures. Supposing the STB 11 includes the digital tuner 111 that is different from the digital tuner incorporated in the television 12 (that is, the digital tuner supporting a channel which is not supported by the digital tuner incorporated in the television 12), a picture represented by the signal falling within the channel which is not supported by the television 12 can be viewed in real time or at any desired time. Moreover, after the STB 11 is dismounted from the television 12, a picture represented by a video signal received by the STB and stored in the storage medium 128 can be viewed.

As long as the digital tuner 111 concurrently supports a plurality of channels, a compressed video signal and a non-compressed video signal to be combined by the transmission unit 117 may represent different programs. Moreover, a compressed video signal to be combined by the transmission unit 117 may not carry a TS but may carry a PS into which the TS is converted. Compared with the TS, the PS has the merit that an amount of data to be transmitted is smaller.

A compressed video signal stored in the storage medium 128 is further compressed or subjected to code conversion by a code converter 130 in order to change transmission methods. Thereafter, the video signal is transferred to a storage medium 138 by way of the interface 131, an interface 104, and an interface 132 that are compatible with the universal serial bus (USB) or conformable to the IEEE 1394 standard. After the video signal is transferred, the mobile viewer 14 is disconnected by unplugging the interface 104 and becomes portable to any place. In the mobile viewer 14, a decoder 133 decodes the video signal stored in the storage medium 138, and a picture is displayed on a display unit 139 according to the video signal. Thus, a user can use the mobile viewer 14 to view a desired picture in any place.

Figure 2:
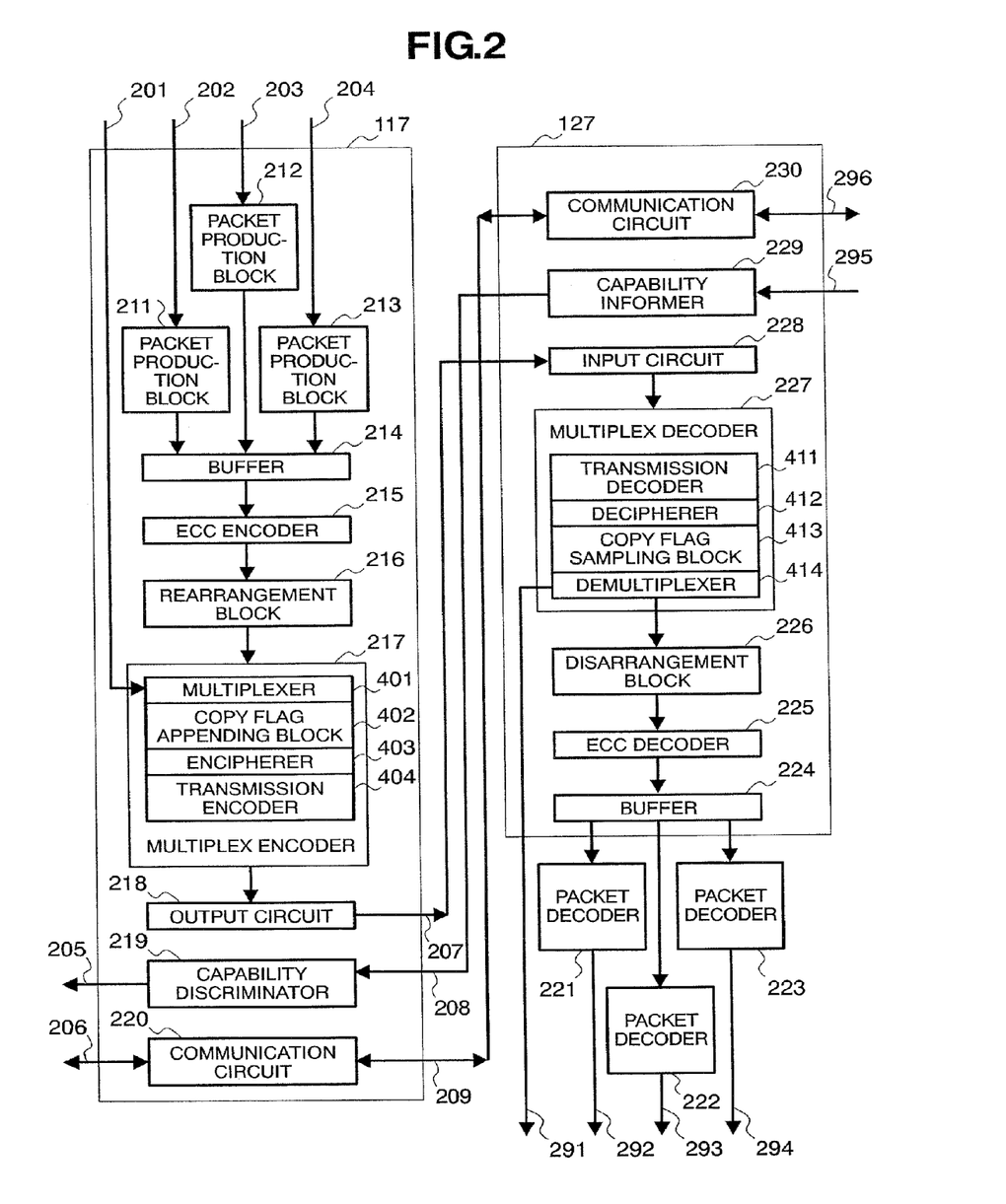
FIG. 2 is a block diagram showing an example of the configurations of a transmission unit and a reception unit included in the video processing system.

FIG. 2 is a block diagram showing an example of the configurations of the transmission unit 117 and reception unit 127 respectively. The actions of the transmission unit 117 and reception unit 127 will be described below. Audio data 202 relevant to a non-compressed video signal sent from the video synthesizer 114 (FIG. 1), a TS output 203 of the digital tuner 111 (FIG. 1), and OSD data 204 sent from the OSD unit 115 (FIG. 1) are transferred to packet production blocks 211, 212, and 213 respectively included in the transmission unit 117. The packet production blocks 211 to 213 produce packets, which can be properly combined with a non-compressed video signal, according to the received signals. The packets produced by the packet production blocks 211 to 213A are transferred to a buffer 214. In the buffer 214, the packets are sorted by packet transmission priority, and then transmitted orderly during a period corresponding to the pulse duration of a blanking signal combined with the non-compressed video signal. An error-correcting code encoder 215 inserts an error-correcting code to the packets sorted in the buffer 214. A rearrangement block 216 rearranges the packets bit by bit so as to improve durability against a burst error, and then transmits the resultant packets to a multiplex encoder 217. The multiplex encoder 217 includes a multiplexer 401 that combines the rearranged packets with a non-compressed video signal sent from the video synthesizer 114 (FIG. 1), a copy flag appending block 402 that appends a copy control flag for the non-compressed video signal, an encipherer 403 that enciphers a video signal, and a transmission encoder 404 that encodes a signal to be transmitted. The output of the multiplex encoder 217 is transmitted as a multiplex video signal to an input circuit 228 included in the reception unit 127 via an output circuit 218.

The multiplex video signal received by the input circuit 228 is transferred to a multiplex decoder 227. The multiplex decoder 227 includes a transmission decoder 411 that decodes an encoded signal, a decipherer 412 that deciphers a video signal, a copy flag sampling block 413 that samples a copy flag, and a demultiplexer 414 that separates the non-compressed video signal 201 and packets from one another. A disarrangement circuit 226 disarranges the packets so as to reproduce original signals. An error-correcting code decoder 225 corrects an error, and transmits the resultant signals to a buffer 224. The signals carrying the packets are temporarily held in the buffer 224, and then transmitted to packet decoders 221 to 223 respectively. The packet decoders 221 to 223 decode the packets received from the buffer 224, and produce audio data 292 relevant to the non-compressed video signal, a TS 293, and OSD data 294 respectively. These data items are shown in FIG. 1 to be transmitted from the reception unit 127 to the storage medium 128.

A capability informer 229 gives the information on the displaying capability of the television (specifications for display and/or display-related characteristics) to a capability discriminator 219 over a communication channel 208. The capability discriminator 219 discriminates the displaying capability of the television 12 according to the information on the displaying capability, and transmits a result of discrimination 205. The result of discrimination 205 is transmitted to the control unit 116 (FIG. 1). The control unit 116 controls the components of the STB 11, which are engaged in handling or transmitting a video signal, so that a video signal will be transmitted in a format suitable for the connected television 12. Moreover, the control unit 116 checks the displaying capability of the television 12 and transmits a multiplex video signal employed in the present embodiment. Owing to the foregoing configurations, the multiplex video signal is not transmitted to a television that is not designed to receive the multiplex video signal (that is, a television including a conventional interface) but a non-compressed video signal along is transmitted thereto. Namely, the connectivity to a television including a conventional interface is ensured. As the component that informs the capability of the television 12, for example, an extended display identification (EDID) system stipulated by the Video Electronics Standards Association (VESA) should preferably be adopted. In the present embodiment, the information on the displaying capability of the television includes, for example, the horizontal and vertical resolutions of the display unit 129, a color rendering index, and a gamma. For effective utilization of the present embodiment, the information on the displaying capability of the television may further include, for example, a timing of displaying a picture represented by a multiplex video signal, a bit rate of a compressed video signal, a list of decodable coding techniques, the storage capacity of the storage medium 128, an available capacity, and a maximum recording speed.

The capability informer 229 and capability discriminator 219 are also used to authenticate equipment or check an enciphering ability. According to, for example, the DVI or HDMI standards, the high-bandwidth digital content protection (HDCP) system licensed by a limited liability company (LLC) is adopted as the encipherment technique. Along with the diversity of contents, it may be necessary to manage a plurality of encipherment techniques in association with the contents or nations in the future. In the present embodiment, a video signal receiving side may include facilities that implement a plurality of equipment authentication techniques or a plurality of encipherment techniques, and an automatic identification/selection circuit may be included for identifying and selecting an appropriate technique by referencing a protocol based on which a transmitting side initiates equipment authentication. On the other hand, the transmitting side may include an automatic identification/selection circuit that identifies a kind of content and a nation where a television is used, and selects an appropriate encipherment technique. For example, a region code recorded on a digital versatile (or video) disk (DVD) is read and used to select an encipherment technique. For a television signal, a broadcasting station may be identified and an encipherment technique may be selected.

A specific encipherment technique may have to be constantly adopted due to national regulations or regulations imposed by an entrepreneur. In this case, if a dedicated video processing system is newly prepared, a cost of development increases. Therefore, a video processing system is provided with a plurality of encipherers that can implement a plurality of kinds of encipherment, and an identification/selection circuit that identifies a kind of encipherment and selects an encipherer according to the result of the identification. At this time, the identification/selection circuit may autonomously identify and select a kind of encipherment. Moreover, a designation circuit may be included for allowing a user to designate a kind of encipherment. Moreover, the designation circuit may be used to designate one of the pieces of encipherment at a factory prior to delivery. In this case, a procedure for changing the designation of encipherment (for example, entry of a command or a password at the STB 11 or television 12) may be hidden behind a user for fear the user may use the designation circuit to change the kind of encipherment into another. Assuming that the designation of encipherment has to be changed after delivery, a procedure for changing the designation of encipherment may be able to be received in the form of a television signal or downloaded from the Internet under a specific condition (for example, a user has to pay a fee). Thus, the hidden procedure of changing the designation of encipherment is disclosed to a user under the specific condition, and the user can change encipherment from one kind to another. This service may be provided when the present embodiment is implemented. Otherwise, the procedure for changing the designation of encipherment may be stored in a storage medium such as a DVD, and the DVD may be supplied as a designation change DVD to the user.

Furthermore, when various kinds of encipherment are used, picture quality may be modified by restricting a resolution or a bit rate of a compressed video signal according to the grade of encipherment.

Communication circuits 220 and 230 perform bidirectional communication over a communication channel 209 and thus allows the control units 116 and 126 shown in FIG. 1 to transfer control information to or from each other. For example, bidirectional communication based on the consumer electronics control (CEC) protocol stipulated in the HDMI standards may be adopted as the bidirectional communication employed in the present embodiment. Moreover, if an error uncorrectable by the error-correcting code decoder 225 occurs, the television 12 transmits a request for retransmission to the STB over the communication channel 209. The STB 11 may respond to the retransmission request and retransmit a compressed video signal that is affected by the error. This permits error-free recording. An identification number or symbol such as a time stamp may be appended to a packet of a compressed video signal contained in a multiplex signal 207 produced by combining the compressed video signal with a non-compressed video signal. The television 12 may transmit the identification number or symbol assigned to an error-stricken packet together with the retransmission request to the STB 11. Consequently, when the retransmission request is issued, the STB 11 may check the identification number or symbol of the error-stricken packet so as to retransmit the original packet of the error-stricken packet alone. Since the STB 11 need not retransmit error-free packets, transfer efficiency improves.

Transmission of packets from the buffer 214, that is, sorting of packets by priority will be described below. The capacity for transmission of packets to be combined with a non-compressed video signal is limited. A packet to be transmitted as a top priority is audio data that is relevant to the non-compressed video signal and that is needed to be reproduced in real time synchronously with a video signal. Therefore, the priority of an audio packet relevant to the non-compressed video signal is set to the highest priority, and the disposition of the audio packet in a data stream is determined as a top priority. A packet of a compressed video signal and a packet of OSD data are disposed in the remaining part of the data stream. The priorities of the compressed video packet and OSD packet are determined arbitrarily. When the OSD packet relates to a non-compressed video signal (or highly relates thereto), the priority of the OSD packet may be higher than that of the compressed video packet. When the possibility that the television 12 may utilize the compressed video signal is high, the priority of the compressed video packet may be higher than that of the OSD packet.

For transmission of a compressed video signal to the storage medium 128, packets should be arranged for fear a maximum recording rate supported by the storage medium 128 may be exceeded. Otherwise, the flow of packets over the communication channel 209 may be controlled in order to control the number of packets to be transmitted. When the television 12 reproduces a compressed video signal in nearly real time, the number of packets to be transmitted has to be controlled based on an encoding rate for the compressed video signal.

Depending on a format for a non-compressed video signal, the packet transmission ability may be insufficient for combining a compressed video signal. In this case, a clock whose pulses are synchronous with pixels represented by the non-compressed video signal is multiplied by n (where n denotes a value equal to or larger than 2). Otherwise, a format specifying that the pulse duration of a blanking signal combined with the non-compressed video signal is extended may be adopted. Thus, the ability to transmit a packet of a compressed video signal improves.

Figure 3:
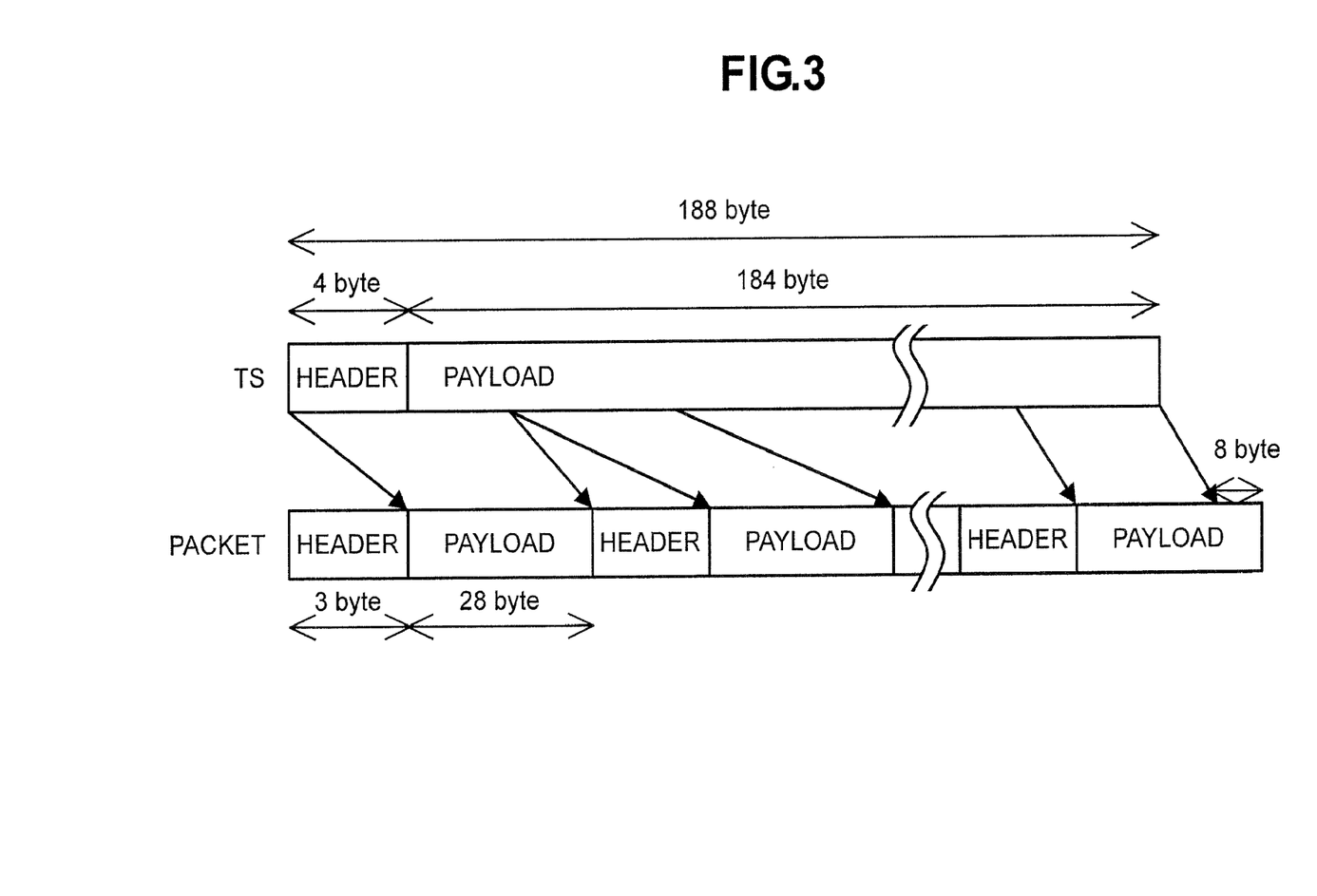
FIG. 3 shows an example of the structure of a packet of a compressed video signal.

FIG. 3 shows an example of the structure of a packet of a compressed video signal. As shown in FIG. 3, a packet of a TS includes a header of four bytes long, and adaptation (or payload) of one hundred and eighty-four bytes long, and comes to one hundred and eighty-eight bytes in total. In order to transmit the TS during an interval between transmissions of a non-compressed video signal (for example, a blanking interval), the packet size should be smaller. In FIG. 3, a packet to be transmitted is composed of a header of three bytes long and payload of twenty-eight bytes long. The TS packet of one hundred and eighty-eight bytes long is segmented into pieces of payload to be contained in seven packets of compressed video signals.

An example of the structure of a header will be described below. The first byte represents a packet type such as a packet of a compressed video signal or audio data. The second and third bytes of sixteen bits long in total represent the order of one of seven sections of a TS packet (three bits), a TS packet number (eleven bits), and a copy control flag (two bits). The TS itself includes a time stamp. The time stamp may be used to exclude the eleven bits of the TS packet number from the header. For convenience' sake, the TS packet number should be included in the header. The TS packet number is used as an identification number with which a packet is identified. If a transmission error occurs, the identification number is checked in order to designate a packet whose retransmission is requested.

For example, assuming that a high-definition video signal is transmitted at a frequency of 20 Mbps, one million and sixty thousand TS packets of one hundred and eighty-eight bytes long are transmitted during one second. If a transmission error occurs, a retransmission request is issued to a transmitting side. In this case, since the baud rate of the communication channel 209 is low (that is, a transfer rate is low), if 100 ms is needed for transmission of error information, TS packet numbers with which at least ten thousand TS packets are identified are needed. Fourteen bits are needed in order to represent a TS packet number. The header of eleven bits long is therefore insufficient for the TS packet number. On the other hand, the payload included in the seventh packet of a compressed video signal has eight bytes left unused. One byte out of the available bytes may be used to state part of the TS packet number that overflows the header. Needless to say, two or three bytes may be used. Moreover, the copy flag may be stated using the available bytes but not be stated in the header. If some bytes are still left unused and available, the frequency of copy, a storage time during a picture capable of being viewed at any desired time can be stored, and/or a copy generation management system-digital (CGMS-G) signal can be stated. If more information need be stated, eight packets of compressed video signals other than seven packets may be allocated to one TS packet.

Second Embodiment

Figure 4:
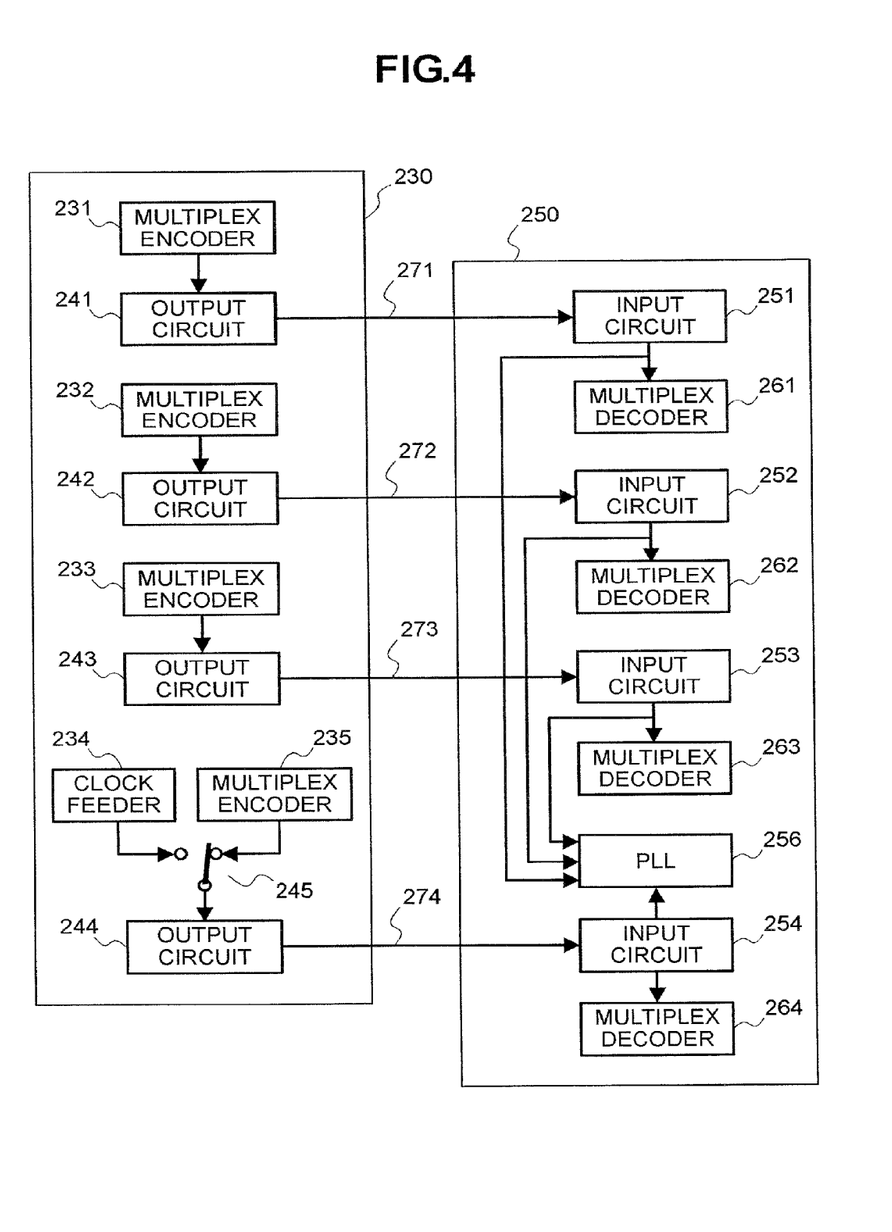
FIG. 4 is a block diagram showing a second embodiment of the video processing system in accordance with the present invention.

FIG. 4 is a block diagram showing another embodiment of the present invention. In the present embodiment, the transmission unit 117 and reception unit 127 included in the system configuration shown in FIG. 1 are replaced with a transmission unit 230 and a reception unit 250 respectively shown in FIG. 4. In the present embodiment, the transmission unit 230 and reception unit 250 are interconnected via an interface including three data lines 271, 272, and 273 over which a video signal is transmitted and a clock line 274 over which a clock is transmitted. The three data lines are used to transmit respective non-compressed video signals of, for example, red, green, and blue. The clock line is used to transmit a reference clock synchronously with which data or a video signal is received. Moreover, ten data items shall be transmitted over the data lines during the cycle of the clock that passes through the clock line. Multiplex encoders 231 to 233 and 235, output circuits 241 to 244, input circuits 251 to 254, and multiplex decoders 261 to 264 are equivalent to the multiplex encoder 217, output circuit 218, input circuit 228, and multiplex decoder 227 respectively. The description of the components will be omitted. The description of the other blocks shown in FIG. 2 will be omitted.

The case where a switch 245 selects a clock feeder 234 is equivalent to the embodiment shown in FIG. 2. In the present embodiment, when high-speed transmission of video data is needed, the connections through the switch 245 are switched to select the multiplex encoder 235. In this case, the clock line is used as a data line in order to make an amount of transmitted video data four-thirds times larger. In this case, the reference clock synchronously with which input data is reproduced by the television 12 is not a clock to be transmitted over the clock line, but the reference clock is sampled from a signal sent over each data line. Therefore, all or at least one of signals received by the input circuits 251 to 254 respectively should be routed to a phase-locked loop (PLL) 256 in order to sample a clock component from the input signal. For sampling of the clock component, a band-pass filter or the like should be used in combination with the PLL. Needless to say, a digital locked loop (DLL) may be substituted for the PLL.

Various formats are adaptable to video data, and numerous reference clocks are usable. In the case where a clock is sampled from a data line and adopted as a reference clock, the cycle of the reference clock need be detected accurately. The detection is quite time-consuming. In the present embodiment, in an initial state, the switch 245 selects the clock feeder 235 and routes a reference clock sent from the clock feeder 235 to the reception unit 250 over the clock line 274. Consequently, the reception unit 250 is readily informed of the cycle of the reference clock. Consequently, the present embodiment is advantageous in terms of the reduction in the time required for initialization to be performed in relation to the cycle of the reference clock.

Using the component that provides the STB 11 with the information on the displaying capability of the television 12 and that is described in conjunction with FIG. 2, the transmission unit 230 is informed of the fact whether the reception unit 250 supports a mode in which the clock line is used as a data line. Moreover, the time required for detection of the cycle of a clock to be performed as part of initialization can be informed in the same manner. Using the bidirectional communication channel 209 shown in FIG. 2, the reception unit 250 can inform the transmission unit 230 of the fact that the initialization is completed.

Third Embodiment

Figure 5:
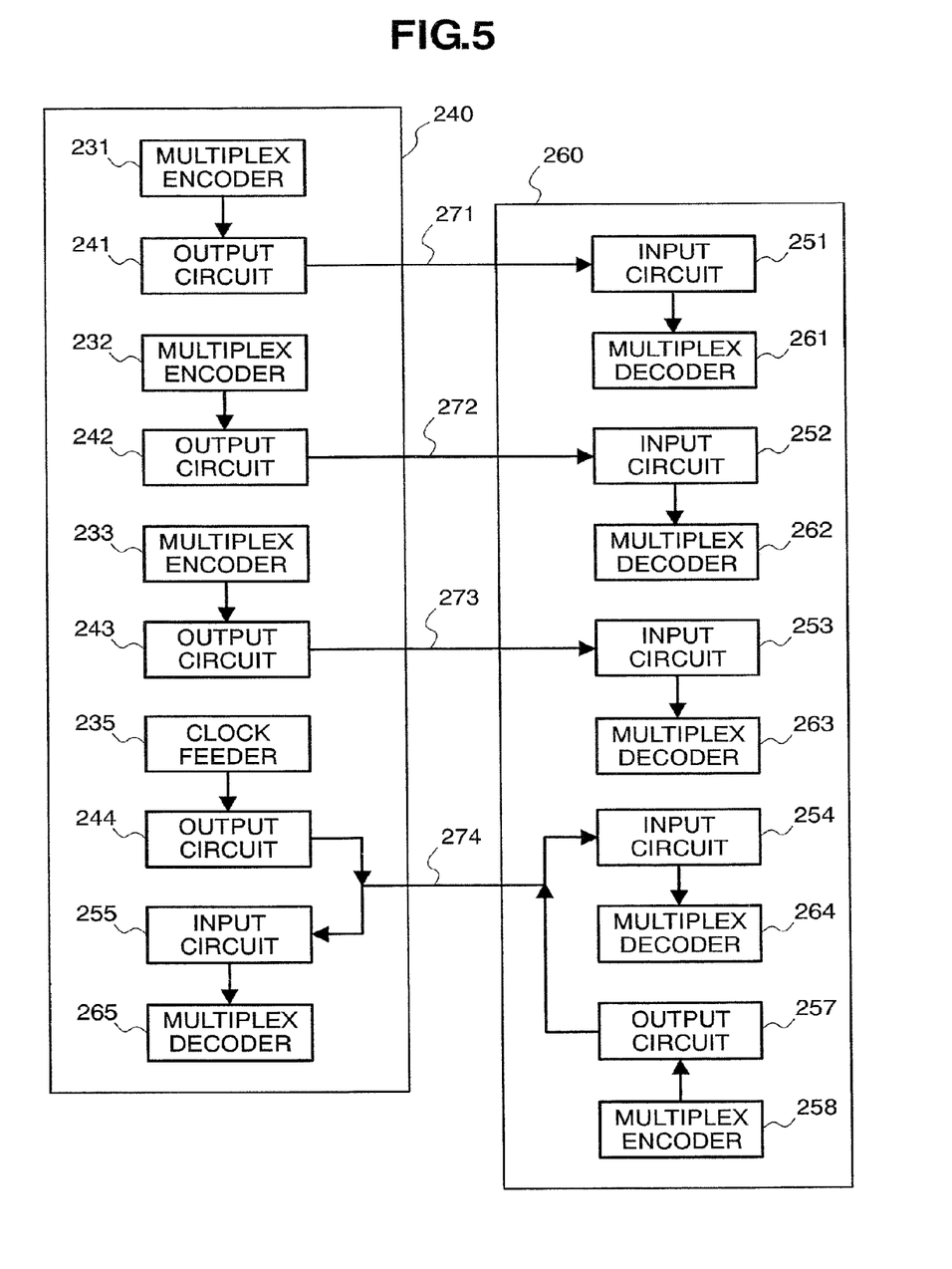
FIG. 5 is a block diagram showing a third embodiment of the video processing system in accordance with the present invention.

FIG. 5 is a block diagram showing another embodiment of the present invention. The present embodiment has the same system configuration as the one shown in FIG. 1 except that the transmission unit 117 and reception unit 127 are replaced with a transmission unit 240 and a reception unit 260 which have the same configurations as those shown in FIG. 4. The same reference numerals are assigned to components identical to those shown in FIG. 4. The present embodiment includes the PLL shown in FIG. 4 as a component. However, the PLL is not shown in FIG. 5 for brevity's sake. The present embodiment further includes an input circuit 255, a multiplex decoder 265, a multiplex encoder 258, and an output circuit 257 which are not included in the embodiment shown in FIG. 4.

In FIG. 5, when data is transmitted using a clock line, the data is not transmitted from the STB 11 to the television 12 but is transmitted from the television 12 to the STB 11. In an initial state, the output circuit 257 is in an off state. Similarly to the embodiment shown in FIG. 4, the transmission unit 240 included in the STB 11 transmits data and a clock to the reception unit 260. After sampling a clock from each data is initiated, data can be transmitted over the clock line. After the output circuit 244 is driven to the off state, the output circuit 257 is started so that the reception unit 260 will transmit data to the transmission unit 240. At this time, if the cycle of the clock is set to the same cycle as that attained in the initial state, a clock can be sampled from the clock line, over which data is inversely transmitted, in the same manner as it is from any other data line. While data is inversely transmitted over the clock line, video data is kept transmitted over the data lines from the transmission unit 240 to the reception unit 260.

Figure 6:
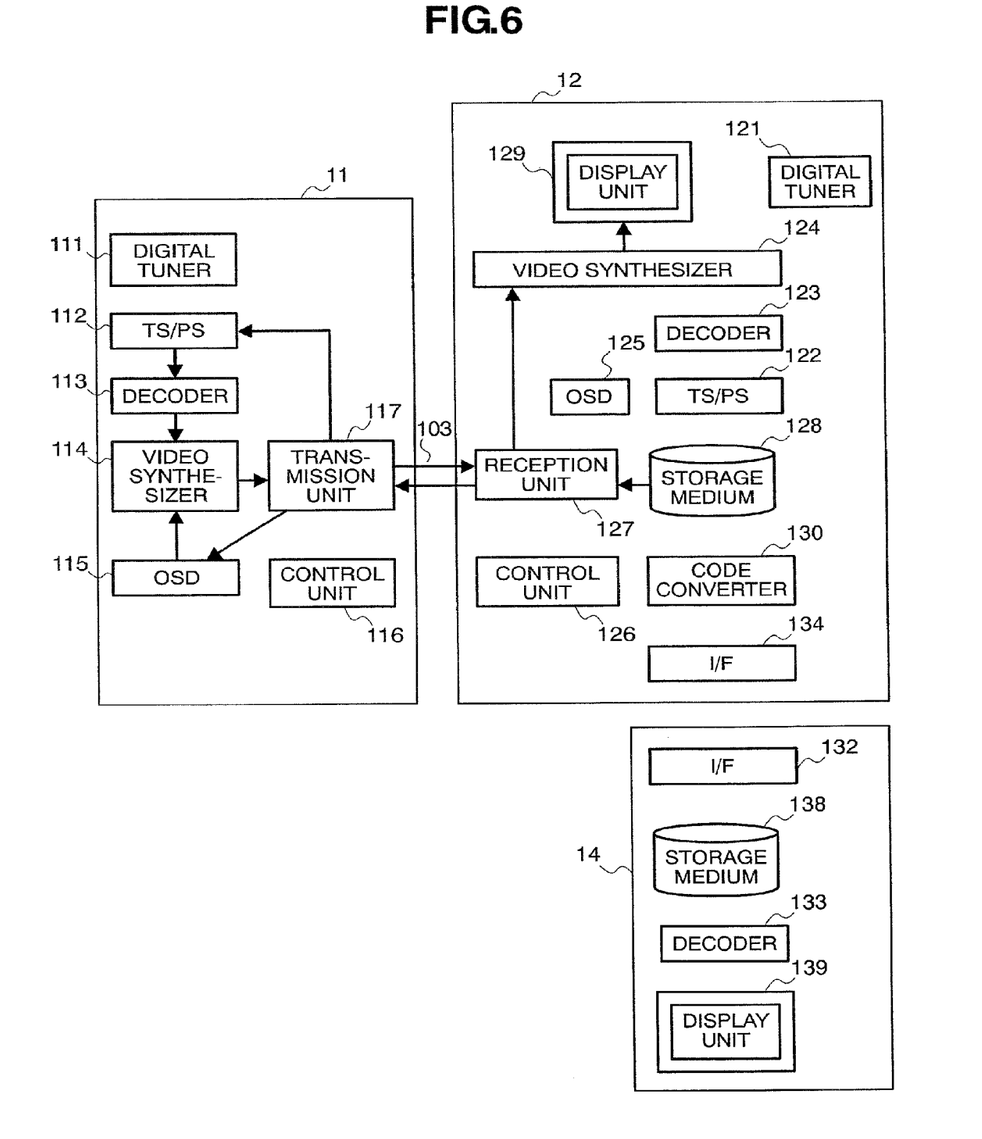
FIG. 6 is a block diagram showing the flow of a video signal in the video processing system of the third embodiment.

FIG. 6 shows an example of the flow of a video signal to be attained in a case where an inverse data transmission facility is included in the system configuration shown in FIG. 1. The television 12 transmits a compressed video signal, which is stored in the storage medium 128, to the STB 11 over the clock line through the inverse data transmission. The TS/PS converter 112 and decoder 113 included in the STB 11 decodes the compressed video signal into a non-compressed video signal. The non-compressed video signal is transmitted back to the television 12 over the data line, and a picture is displayed on the display unit 129 according to the decoded video signal. Moreover, if OSD data stored in the storage medium has to be displayed, the OSD data is transmitted to the OSD circuit included in the STB 11 over the clock line. The video synthesizer 114 synthesizes the OSD data with the compressed video signal and transmits the resultant signal to the television 12.

Owing to the inverse data transmission facility, even a television devoid of a decoder can reproduce a video signal stored in the storage medium and display a picture according to the video signal. The same applies to a case where although a television includes a decoder, the decoder does not support a coding technique used to encode a compressed video signal. Furthermore, assuming that transmission of an intensely compressed television signal to be encoded according to a novel coding technique which has not been devised when a television was put on the market is initiated in order to provide a broadcasting service, the recording facility of the television and the facility thereof permitting a user to view a picture at any desired time can be employed. Moreover, even when a compressed video signal produced using a coding technique and a copyright protection technique that are not supported by a television are stored in the television, as long as an STB supports the techniques, the stored compressed video signal may be transmitted to the STB so that copyright protection and decoding will be performed by the STB. The video signal having undergone the copyright protection and decoding is returned as a non-compressed video signal to the television. Eventually, a picture can be displayed based on the video signal.

Figure 7:
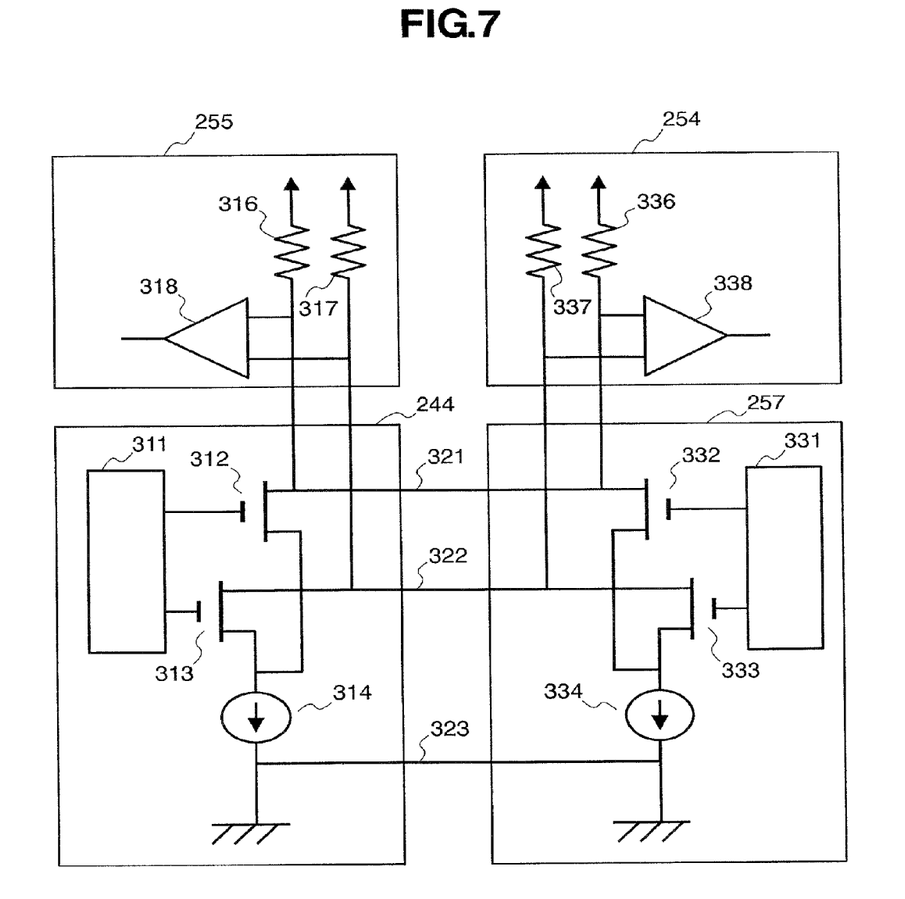
FIG. 7 shows an example of the circuitries of an output circuit and an input circuit respectively included in the third embodiment.

FIG. 7 shows an example of the circuitries of the input circuits 254 and 255 and the output circuits 244 and 257 which are shown in FIG. 5. Before a description will be made in conjunction with FIG. 7, the actions of an input circuit and an output circuit which have the basic circuitries shown in FIG. 8 will be described below. An output circuit 31 includes an output controller 311, transistors 312 and 313, and a constant current source 314, while an input circuit 32 includes terminal resistors 336 and 337 and a differential discriminator 338.

Figure 8:
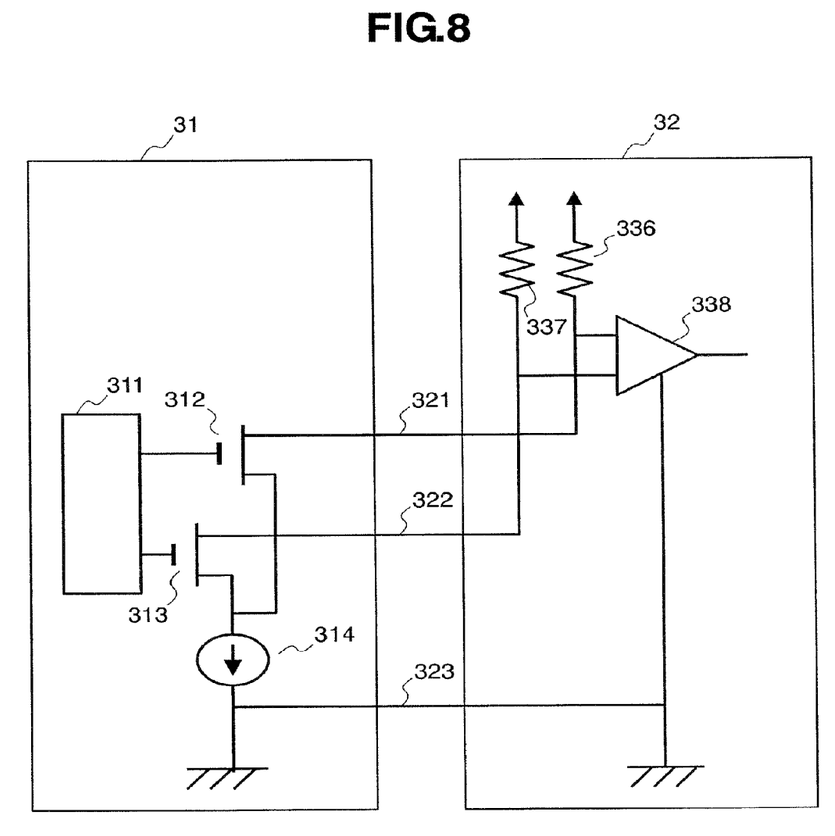
FIG. 8 shows an example of the basic circuitries of an output circuit and an input circuit respectively included in a video processing system.

The output controller 311 switches the states of the transistors 312 and 313 so that the states will be a combination of an on state and an off state or a combination of the off state and on state. When the transistors 312 and 313 are in the on and off states respectively, the same current as the one flowing from the constant current source 314 flows along a signal line 321, and a voltage is developed across the terminal resistor 336. Since no current flows along a signal line 322, the voltage across the terminal resistor 337 is 0 V. When the transistors 312 and 313 are in the off and on states respectively, since no current flows along the signal line 321, the voltage across the terminal resistor 336 is 0 V. The same current as the one flowing from the constant current source 314 flows along the signal line 322, and a voltage is developed across the terminal resistor 337. So-called differential transmission is achieved. The differential discriminator 338 detects a potential difference between the terminal resistors, thus a logical level is determined.

The circuitries shown in FIG. 7 are realized by connecting input circuits and output circuits, which have the same circuitries as those shown in FIG. 8, in parallel with each other. Two output circuits connected in parallel with each other are not started simultaneously. The output controller 331 (or 311) included in the output circuit that is not in operation controls the states of the transistors 312 and 313 (or transistors 332 and 333) so that both the states will be the off states. Both the input circuits may be started, or the terminal resistors 316 and 317 (or 336 and 337) included in the input circuit that is unused may be disconnected. Moreover, the differential discriminator 318 (or 338) may be halted in order to reduce the power consumption.

Fourth Embodiment

Figure 9:
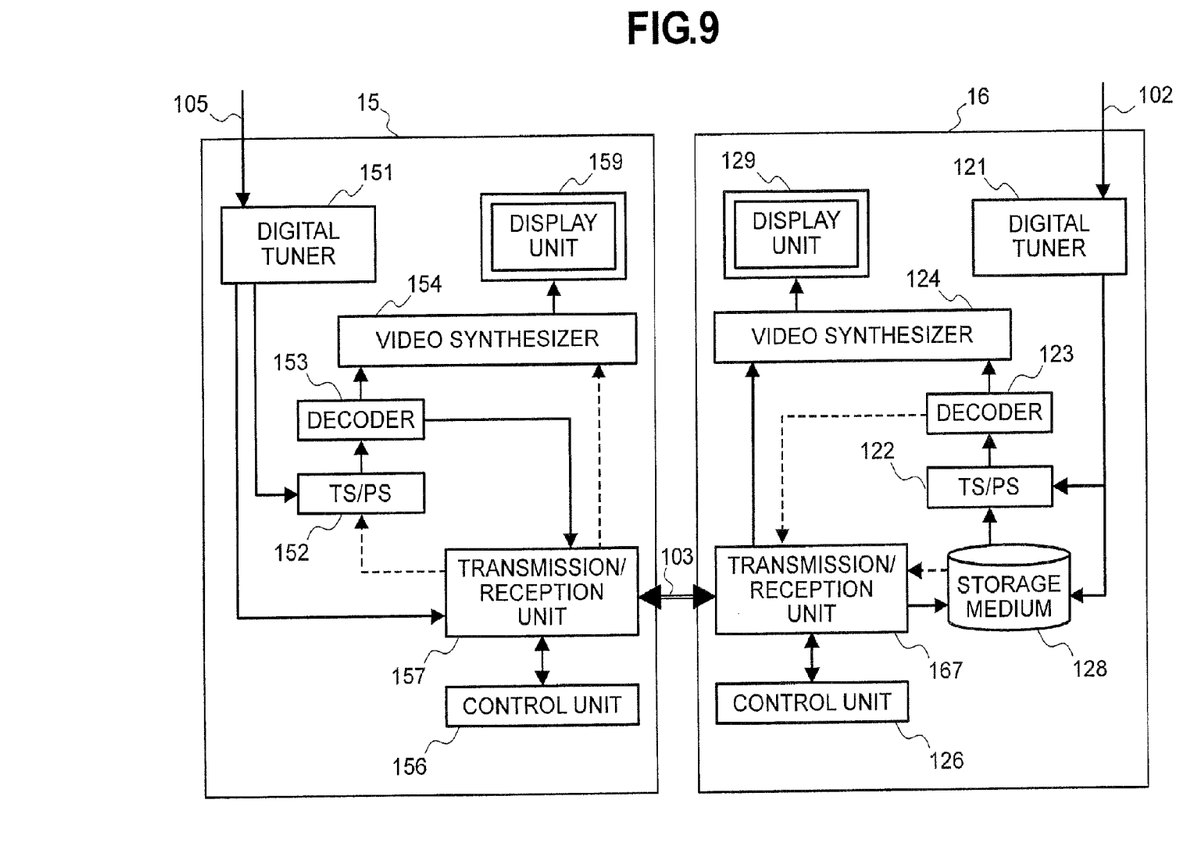
FIG. 9 is a block diagram showing a fourth embodiment of the video processing system in accordance with the present invention.

FIG. 9 is a block diagram showing another embodiment of the present invention, wherein two televisions 15 and 16 are adopted as video processing systems. Namely, the present embodiment is an embodiment in which the STB 11 shown in FIG. 1 includes a display unit and functions as a television. Similarly to the embodiment shown in FIG. 1, a multiplex video signal having a non-compressed video signal and a compressed video signal combined with each other is transmitted from the television 15 to the television 16 via a video interface 104. A picture represented by the non-compressed video signal is displayed on a display unit 129 included in the television 16. On the other hand, the compressed video signal is stored in the storage medium 128, and reproduced at any user's desired time so that a picture will be displayed on the display unit 129.

Figure 10:
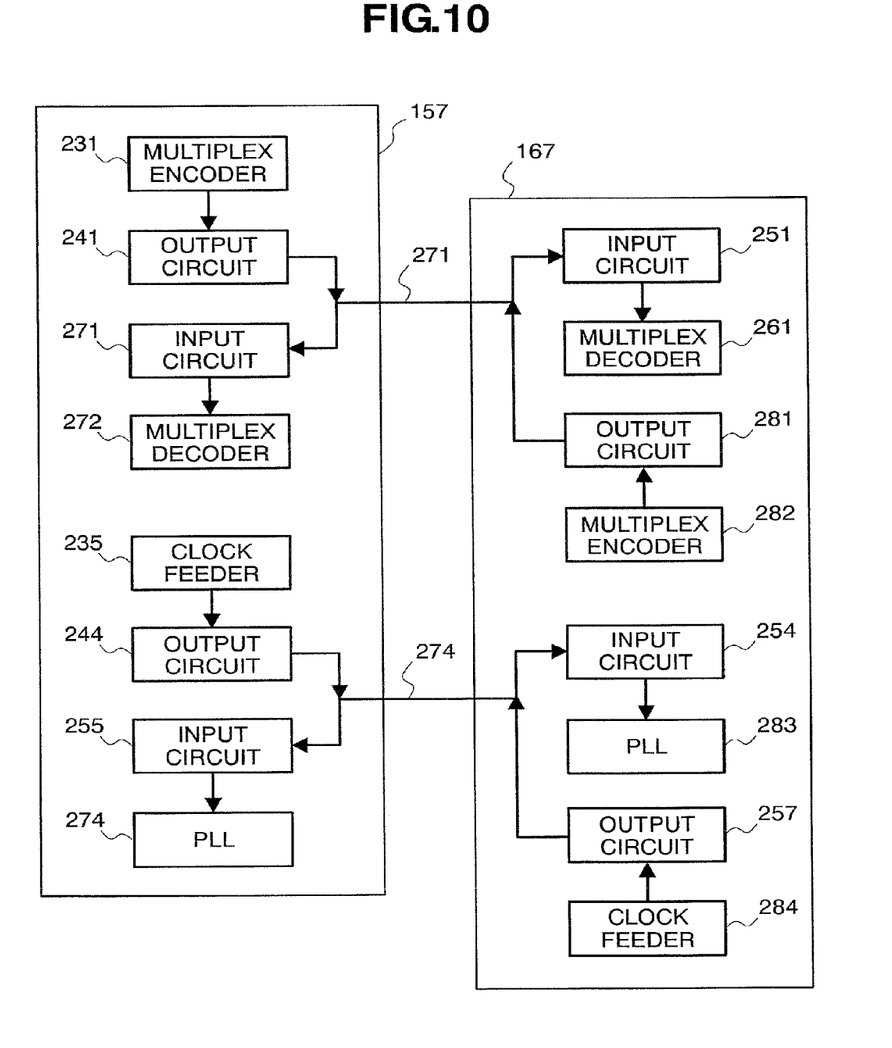
FIG. 10 shows an example of the circuitries of an output circuit and an input circuit respectively included in the fourth embodiment.

FIG. 10 shows an example of the configurations of transmission/reception units 157 and 167. In this example, both a data line 271 and a clock line 274 permit bidirectional transmission. The circuitries of an input circuit and an output circuit are identical to those shown in FIG. 7. When data is transmitted from the transmission/reception unit 157 to the transmission/reception unit 167, the data is transferred from a multiplex encoder 231 through an output circuit 241 to each of an input circuit 251 and a multiplex decoder 261. On the other hand, a clock is transferred from a clock feeder 235 through an output circuit 244 to each of an input circuit 254 and a PLL 283. In contrast, when the data is transmitted from the transmission/reception unit 167 to the transmission/reception unit 157, the data is transferred from a multiplex encoder 282 through an output circuit 281 to each of an input circuit 271 and a multiplex decoder 272. On the other hand, a clock is transmitted from a clock feeder 284 through an output circuit 257 to each of an input circuit 255 and a PLL 274.

As mentioned above, when the television 15 or 16 is provided with the facility of inversely transmitting a video signal, the actions to be described below will be performed. Specifically, as indicated with dashed lines in FIG. 9, a compressed video signal stored in the storage medium 128 included in the television 16 is transmitted to the television 15. A TS/PS converter 152 and a decoder 153 included in the television 15 produce a non-compressed video signal, and a picture is displayed on a display unit 159 according to the video signal. Alternatively, after a TS/PS converter 122 and a decoder 123 included in the television 16 produce a non-compressed video signal and transmit it to the television 15, a picture may be displayed on the display unit 159 according to the video signal.

According to the present embodiment, two interconnected televisions (video processing systems) can share a digital tuner, a storage medium, a decoder, and various resources required for copyright protection.

In the aforesaid embodiments, an STB and a television are adopted as video processing systems. Even when a video signal source such as a recorder or a DVD player and a monitor are paired, the same advantages as those described above can be expected.

Using the aforesaid embodiments of the present invention, a real-time non-compressed video signal that is not packetized and a compressed video signal that is packetized can be transmitted simultaneously via one interface. Specifically, a plurality of digital video signals conformable to different standards can be transmitted via one interface. In a video processing system such as a television to which the present invention is adapted, while a picture represented by a non-compressed video signal sent from a signal source such as an STB is being displayed on the display unit of the television, a compressed video signal that is transmitted simultaneously can be stored in a storage medium such as a hard disk drive (HDD) incorporated in the television, and a picture represented by the compressed video signal can be viewed at any desired time. In other words, a real-time picture that is a video content and a picture stored at a different time can be displayed simultaneously on the same screen. Namely, while the video content is viewed in real time, the stored picture can be viewed at a desired time.

Furthermore, when a physical layer that deals with high-speed transmission via an interface which supports transmission of a non-compressed video signal is used for data transmission, if transmission of the non-compressed video signal is unnecessary, many compressed video signals can be transmitted or a video signal can be transferred quickly.

Furthermore, according to the aforesaid embodiments, various copyright protection technologies can be properly coped with. Satisfactory viewing can be achieved under conditions for fair use.

The present invention is applied to a video signal transmission method for multiplexing a non-compressed video signal and a compressed video signal via one interface. In particular, the present invention will prove effective especially for transfer of a video signal between, for example, a video signal source such as an STB and a video display device such as a television.

While we have shown and described several embodiments in accordance with out invention, it should be understood that disclosed embodiments are susceptible of changes of modifications without departing from the scope of the invention. Therefore, we do not intend to be bound by the details shown and described herein but intend to cover all such changes and modifications a fall within the ambit of appended claims.

What is claimed is:

1. A video signal transmission method in a video signal transmission device including a function for transmitting a video signal via an interface having three data lines for transmitting video signal data and a clock line for transmitting a clock signal and video signal data, the method comprising:
   a first controlling step which transmits respective red, green and blue signals of video signal data to respective lines of the three data lines and transmits a clock signal, of which a cycle is equal to 10 times a bit period of the video signal data, to the clock line; and
   a second controlling step which transmits video signal data, including a format configured to sample a clock signal, to the three data lines and the clock line, and each line transmits one-fourth of the video signal data.

2. The method according to claim 1,
   wherein the video signal transmitted in the first controlling step is a non-compressed video signal; and
   wherein the video signal transmitted in the second controlling step includes a compressed video signal.

* * * * *